(12) United States Patent
Obst et al.

(10) Patent No.: US 11,913,461 B2
(45) Date of Patent: Feb. 27, 2024

(54) FAN AND METHOD FOR DETERMINING A MEDIA FLOW MOVED BY THE FAN

(71) Applicant: ZIEHL-ABEGG SE, Künzelsau (DE)

(72) Inventors: Raphael Simon Obst, Öhringen (DE);
Matthias Carsten Kammerer, Kupferzell (DE); Mato Mathias Krcmar, Öhringen (DE); Frieder Loercher, Braunsbach (DE); Alexander Herold, Hardthausen (DE)

(73) Assignee: ZIEHL-ABEGG SE, Kunzelsau (DE)

( * ) Notice: Subject to any disclaimer, the term of this patent is extended or adjusted under 35 U.S.C. 154(b) by 71 days.

(21) Appl. No.: 17/618,147

(22) PCT Filed: May 7, 2020

(86) PCT No.: PCT/DE2020/200033
§ 371 (c)(1),
(2) Date: Dec. 10, 2021

(87) PCT Pub. No.: WO2020/249168
PCT Pub. Date: Dec. 17, 2020

(65) Prior Publication Data
US 2022/0235781 A1     Jul. 28, 2022

(30) Foreign Application Priority Data
Jun. 13, 2019   (DE) ..................... 10 2019 208 640.3

(51) Int. Cl.
*F04D 25/06*     (2006.01)
*F04D 25/08*     (2006.01)
*F04D 27/00*     (2006.01)

(52) U.S. Cl.
CPC ......... *F04D 25/0666* (2013.01); *F04D 25/08* (2013.01); *F04D 25/082* (2013.01);
(Continued)

(58) Field of Classification Search
CPC ......... F04D 25/0666; F04D 25/08–082; F04D 27/001; F05D 2270/3011;
(Continued)

(56) References Cited

U.S. PATENT DOCUMENTS

| | | | |
|---|---|---|---|
| 3,934,471 A * | 1/1976 | White | G01F 1/88 73/861.04 |
| 5,586,861 A * | 12/1996 | Berger | F04D 27/00 415/118 |
| 2017/0305689 A1* | 10/2017 | Hottovy | B65G 53/66 |

FOREIGN PATENT DOCUMENTS

| | | | | |
|---|---|---|---|---|
| CN | 207539068 U | * | 6/2018 | ............ F04D 17/16 |
| DE | 3916529 A1 | * | 11/1999 | |

(Continued)

OTHER PUBLICATIONS

GOST 10921-2017 (Radial and axial fans. Methods of aerodynamic tests).

*Primary Examiner* — Alexander B Comley
(74) *Attorney, Agent, or Firm* — FisherBroyles, LLP; Jason P. Mueller

(57) ABSTRACT

A fan is described, with the aid of which a volume flow and/or a mass flow of a medium moved by the fan (1) can be determined. This fan comprises an electric motor (2) and an impeller (3) driven by the electric motor (2), wherein the impeller (3) moves a gaseous medium in a media flow from an inflow side (5) to an outflow side (7). The fan additionally comprises a pressure sensor system, a speed ascertainment system, and an evaluation unit. The pressure sensor system is designed to ascertain an actual pressure difference (Δp*) between a first region (10) and a second region (13), wherein the first region (10) and/or the second region (13) is/are formed in the electric motor (2), wherein a pressure ($p_A$) prevails in the first region (10), which corresponds to a pressure ($p_1$) present on the inflow side, wherein a pressure (Continued)

($p_B$) prevails in the second region (13), which corresponds to a pressure ($p_2$) present on the outflow side. The speed ascertainment system is designed to ascertain an actual speed (n) of the impeller (3). The evaluation unit is finally designed to quantitatively determine a mass flow and/or a volume flow of the medium based on the actual pressure difference ($\Delta p^*$), the actual speed (n), and a pressure characteristic curve of the fan (1).

Furthermore, an electric motor for this fan and a corresponding method are disclosed.

16 Claims, 9 Drawing Sheets

(52) U.S. Cl.
CPC ........ *F04D 27/001* (2013.01); *F05D 2260/83* (2013.01); *F05D 2270/3011* (2013.01); *F05D 2270/3015* (2013.01); *F05D 2270/3061* (2013.01)

(58) Field of Classification Search
CPC ..... F05D 2270/3015; F05D 2270/3061; F05D 2260/83; G01F 1/88; G01F 1/34
See application file for complete search history.

(56) References Cited

FOREIGN PATENT DOCUMENTS

| | | | | |
|---|---|---|---|---|
| DE | 19851523 C1 | | 5/2000 | |
| DE | 20320280 U1 | * | 5/2004 | ............. F04D 27/00 |
| DE | 102015219150 A1 | * | 4/2017 | ............. F04B 1/0404 |
| DE | 102015219150 A1 | | 4/2017 | |
| DE | 102017122238 A1 | | 3/2019 | |
| DE | 102018211833 A1 | | 1/2020 | |
| EP | 3045733 A1 | * | 7/2016 | ......... F04D 25/0666 |
| EP | 3045733 A1 | | 7/2016 | |
| EP | 3048430 A1 | * | 7/2016 | ............. F04D 17/16 |
| GB | 2512043 A | * | 9/2014 | ......... F24F 11/0001 |
| GB | 2538217 A | | 11/2016 | |
| RU | 2584051 C2 | | 5/2016 | |
| RU | 2639241 C1 | | 12/2017 | |
| WO | 2011131214 A1 | | 10/2011 | |
| WO | 2017084694 A1 | | 5/2017 | |
| WO | WO-2017084694 A1 | * | 5/2017 | ............. F02M 25/08 |
| WO | 2020249168 A1 | | 12/2020 | |

* cited by examiner

FAN AND METHOD FOR DETERMINING A MEDIA FLOW MOVED BY THE FAN

CROSS-REFERENCE TO RELATED APPLICATIONS

This application is a national stage entry application under 35 U.S.C. 371 of PCT Patent Application No. PCT/DE2020/200033, filed 7 May 2020, which claims priority to German Patent Application No. 10 2019 208 640.3, filed 13 Jun. 2019, the entire contents of each of which are incorporated herein by reference.

FIELD

The present disclosure relates to a fan for determining a media flow moved by the fan, comprising an electric motor and an impeller driven by the electric motor, wherein the impeller moves a gaseous medium in a media flow from an inflow side to an outflow side.

The disclosure furthermore relates to an electric motor for this fan and a corresponding method.

BACKGROUND

A fan typically consists of an electric motor and an impeller driven by this electric motor. The electric motor has a stator and a rotor rotatably mounted relative to the stator. The rotor is coupled to the impeller.

During operation, the fan conveys an air flow—also referred to in general as a media flow hereinafter—from the inflow side (usually) through an inlet nozzle and through the impeller to an outflow side. A pressure $p_1$ is present on the inflow side and a pressure $p_2$ is present on the outflow side. It has been shown here that in general a unique assignment of a pressure difference $\Delta p = p_2 - p_1$ to a media flow moved by the fan can be established. The characteristic curve characterizing this assignment is often also referred to as the "characteristic curve of the static pressure increase", wherein the characteristic curve is related to a calibration speed and a calibration air density and can usually be obtained during calibration measurements.

Since, in a very good approximation, the volume flow is proportional to the speed and the pressure difference is proportional to the square of the speed, at arbitrary, but known speed, this characteristic curve can be used to determine the current air volume flow. This is because it is possible to back calculate on the characteristic curve by using these relationships from a measured current existing pressure difference and a current existing speed.

The pressure difference $\Delta p$ is also proportional to the air density, whereby with known or estimated air density, the characteristic curve can also be used, even if the calibration air density is not present. Therefore, an air volume flow may be determined. Since both the pressure difference $\Delta p$ and also the air mass flow are proportional to the density, an air mass flow can be determined directly without knowing the density. Therefore, from a measured pressure difference $\Delta p$, a known fan speed, and a known or estimated density, the air volume flow or, without knowing the density, the air mass flow can be determined in running fan operation. These values for volume flow or mass flow can be used in a higher-order regulator, for example, if a predefined air volume per unit of time is to be moved in an application scenario.

However, this volume flow or mass flow determination has the disadvantage that the pressures $p_1$ and $p_2$ can be measured without problems during calibration measurements. However, the measurement in practical usage scenarios is difficult, since additional pressure sensors have to be installed and wired to an evaluation unit. However, it is not rare that these sensors cannot be installed for reasons of space or for reasons of robustness. Moreover, the wiring of the sensors significantly increases the installation effort. These methods are therefore often impractical and costly in practice.

A sensor arrangement which is integrated in an electronics housing of an electric motor is known from DE 10 2015 219 150 A1. A pressure feedthrough and pressure hoses connect the sensor inside the electric motor to the respective measurement location outside the motor. This arrangement offers the advantage that only pressure hoses have to be laid to the measurement locations and external wiring of sensor units is omitted. The installation effort is thus significantly reduced. Nonetheless, laying the pressure hoses is necessary, which still creates a not insignificant installation effort and is not possible in all usage scenarios.

SUMMARY

The present disclosure is therefore based on the object of designing and refining a fan, an electric motor, and a method of the type mentioned at the outset in such a way that it is reliably possible to determine a volume flow or a mass flow of a medium with little effort.

The above-mentioned object is achieved according to the present disclosure, in an embodiment, by the features of claim 1. Accordingly, the fan under discussion has a pressure sensor system, a speed ascertainment system, and an evaluation unit, wherein the pressure sensor system is designed to ascertain an actual pressure difference between a first region and a second region, wherein the first region and/or the second region is/are formed in the electric motor, wherein a pressure prevails in the first region which corresponds to a pressure present on the inflow side, wherein a pressure prevails in the second region which corresponds to a pressure present on the outflow side, wherein the speed ascertainment system is designed to ascertain an actual speed of the impeller, and wherein the evaluation unit is designed to determine a mass flow and/or a volume flow of the medium based on the actual pressure difference, the actual speed, and a pressure characteristic curve of the fan.

The above-mentioned object is achieved with respect to an electric motor, in an embodiment, by the features of claim 15. The electric motor is accordingly designed for a fan according to the disclosure and has a stator and a rotor rotatably mounted relative to the stator, wherein the rotor is coupled to the impeller of the fan.

The above-mentioned object is achieved, in an embodiment, with respect to a method by the features of claim 16. The method accordingly comprises the following steps:

ascertaining an actual pressure difference between a first region and a second region, wherein the first region and/or the second region is/are formed in the electric motor, wherein a pressure prevails in the first region which corresponds to a pressure present on the inflow side, wherein a pressure prevails in the second region which corresponds to a pressure present on the outflow side, ascertaining an actual speed of the impeller, and
determining a mass flow and/or a volume flow of the medium based on the actual pressure difference, the actual speed, and a pressure characteristic curve of the fan.

It has first been recognized according to the disclosure that to determine a media flow moved by the fan, the inflow-side and outflow-side pressures $p_1$ and $p_2$ do not necessarily have to be measured. Rather, it has been recognized that the media flow also induces pressure changes close to the motor and/or in the motor, which are also suitable for the determination of the media flow.

It has been recognized that these pressures measured close to the motor and/or in the motor can be used completely analogously to the pressures $p_1$ and $p_2$ and an analogous density and speed dependence on a pressure characteristic curve exists. Only the pressure characteristic curve then has to be adapted to the sensor system used according to the disclosure, which does not represent an obstacle in practice, however. In this way, a fan or an electric motor may be designed, in which, without the necessity of external sensors or hoses led to certain measurement locations outside the electric motor, a mass flow and/or a volume flow of the medium moved by the fan may be quantitatively determined. A quantitative statement about the mass flow and/or the volume flow can be made in this way. This means that a quantitative determination of the mass flow and/or the volume flow is possible.

The fan according to an embodiment has a pressure sensor system, a speed ascertainment system, and an evaluation unit for this purpose. The pressure sensor system is designed to ascertain an actual pressure difference between a first region and a second region, wherein the first region and/or the second region is/are formed in the electric motor. Where the first and second regions are specifically formed is dependent on the respective design of the electric motor, its relative location in relation to the impeller of the fan, the general structure of the fan, and further design factors. It is important here that a pressure prevails in the first region which corresponds to a pressure present on the inflow side, and that a pressure prevails in the second region which corresponds to a pressure present on the outflow side. How specific these correspondences are is ultimately irrelevant for the present disclosure, as long as a monotonous relationship prevails between the pressures in the first or second region and the pressures present on the inflow side or outflow side, respectively. This means that a unique relationship has to exist between the respective corresponding pressures, but this relationship does not necessarily have to be known. This is because these relationships are finally mapped in the pressure characteristic curve, so that the knowledge about the relationships is incorporated therein.

The speed ascertainment system is designed to ascertain the speed of the impeller. This speed ascertainment system can be formed by a dedicated speed sensor. However, it is also possible—in particular in electronically commutated motors (EC motors)—to use the parameters present from the motor electronics. The speed is usually required there in any case for the regulation and is thus already provided. In this embodiment, the speed ascertainment system can access these already existing values.

The evaluation unit is designed to (quantitatively) determine a mass flow and/or a volume flow of the medium based on the ascertained actual pressure difference, the ascertained actual speed, and a pressure characteristic curve of the fan. The pressure characteristic curve reflects a relationship between a pressure difference and a volume flow respectively resulting in the event of a pressure difference. The pressure characteristic curve has been recorded at a calibration speed and a calibration air density here. Since—as already stated above—the volume flow, in a very good approximation, is proportional to the speed and the pressure difference is proportional to the square of the speed, it is possible to calculate back to the pressure characteristic curve using the actual speed. Since the pressure difference is proportional to the density of the medium, it is possible to calculate back to a calibration density of the medium from a known or estimated density of the medium. If a mass flow of the medium is to be determined instead of a volume flow of the medium, the pressure characteristic curve can also reflect a relationship between a pressure difference and a corresponding mass flow. Therefore, a fan results overall in which a volume flow or a mass flow of the medium moved by the fan can be determined without extensive installation measures being necessary. Rather, the required sensor system and the required units are already integratable into the fan at the factory, so that at the usage location of the fan, the fan solely has to be installed and put into operation.

In principle, it is unimportant how the fan is specifically constructed. Axial fans can be used just as well as radial fans, diagonal fans, or crossflow fans, to mention four common types of fans solely as examples. It is solely important that a media flow moved by the impeller of the fan results in the described pressure dependencies in a first and a second region. However, the fan according to the disclosure is typically a radial fan, the motor of which is oriented toward the inflow side or toward the outflow side. Without restriction of the generality, the following statements relate to an electric motor which is arranged on the outflow side of the fan. However, a person skilled in the art will understand that the following statements apply accordingly to other arrangements of the electric motor with respect to the fan.

In principle, it is also unimportant which medium is conveyed by the fan according to the disclosure. The fan can move greatly varying gaseous media, wherein the fan is typically used for conveying air.

It is ultimately also unimportant here which usage scenario the fan is used in. It is essential that the fan moves a gaseous medium. However, the purpose for which this takes place is secondary. The fan can thus cool the surface of a heat exchanger in an air conditioning cabinet or can be used to aerate or ventilate a building or a room, to mention only a few applications as examples.

In one design, the pressure sensor system comprises a first absolute pressure sensor and a second absolute pressure sensor. The first absolute pressure sensor measures a pressure which prevails in the first region and the second absolute pressure sensor measures a pressure which prevails in the second region. The absolute pressure sensors can be implemented here by greatly varying sensors known from practice. It is solely important that the absolute pressure sensors are suitable for measuring the respective existing gaseous medium and are sensitive enough for measuring the respective existing pressure. However, this requirement is simple to master.

To measure the pressure prevailing in the first region, the absolute pressure sensor can be arranged in the first region. In this way, the pressure in the first region can be ascertained particularly simply and without further design measures. Alternatively, the first absolute pressure sensor can also be arranged outside the first region and connected via a hose to the first region. In this alternative embodiment, a first measurement chamber is formed on or in the first absolute pressure sensor, which is connected via the hose to the first region. In this way, an approximately equal pressure prevails in the first measurement chamber as in the first region, so that the pressure in the first region can also be reliably measured in this way. By using such a hose, the sensor can be attached more flexibly, so that the first region can also be formed at points at which there would be no space for the attachment of a sensor. Nonetheless, this hose can be laid inside the electric motor, so that laying hoses is still omitted during the installation of the fan in the usage environment.

This applies accordingly to the second absolute pressure sensor, which can be arranged in the second region or in a second measurement chamber connected via a hose to the second region. The above-mentioned statements with respect to the first absolute pressure sensor apply accordingly here.

In another refinement, the pressure sensor system comprises a differential pressure sensor, which has a first sensor surface and a second sensor surface. The differential pressure sensor then generates a sensor signal which is dependent on the difference of the pressures at the first sensor surface and at the second sensor surface. In this way, the actual pressure difference does not have to be calculated from measured absolute values, but rather is provided directly. In the pressure sensor system designed in this way, the first sensor surface of the differential pressure sensor is subjected to a pressure in the first region and the second sensor surface of the differential pressure sensor is subjected to a pressure in the second region. In this case—as in the embodiment having two absolute pressure sensors—the sensor surface can be in direct contact with the respective region or a hose or an air duct can connect the respective sensor surface with respect to pressure to the assigned region. Suitable differential pressure sensors are well known from practice.

In various electric motors, it can occur that various regions of the electric motor are connected to one another in such a way that independently of pressures present on the outflow side or inflow side, a pressure equalization can take place within the individual regions. Therefore, in one refinement, a bulkhead can be provided in such electric motors, which is formed inside the electric motor. The bulkhead prevents such a pressure equalization or at least significantly reduces it. In this way, first and second regions can also be defined in such electric motors. Such a bulkhead can be attached, for example, in an electric motor in external rotor construction at a transition between bearing tube and electronics housing on the starter bushing.

In one embodiment of the first region, this first region is formed in a bearing tube. For this purpose, the electric motor has a specially designed motor shaft around which the rotor or the impeller coupled to the rotor can rotate relative to the stator of the electric motor. The coupling between impeller and rotor can be produced here in such a way that the impeller is connected via a rotor housing to the motor shaft. The motor shaft is guided here through a bearing tube of the electric motor and is rotatably mounted by means of at least one bearing. In practice, two bearings are very frequently used, wherein one bearing is pressed into each of the two ends of the bearing tube. In this embodiment of the first region, the motor shaft has a feedthrough which connects an opening at a front end of the motor shaft to an opening on a long side of the motor shaft. In this way, the pressure in the bearing tube equalizes with the pressure prevailing at the front end of the motor shaft. When the front end of the motor shaft provided with the opening is oriented on the inflow side, a first region in the bearing tube is formed in this way. It is recognizable that in the case of an orientation of the front end of the motor shaft provided with the opening toward the outflow side, a second region can also be formed in the bearing tube in principle.

This feedthrough is, in an embodiment, formed in the form of a bore in the motor shaft. An essentially central bore in the longitudinal direction and a transverse bore on the long side of the motor shaft can form the feedthrough here, wherein the central bore and the transverse bore may merge into one another. Which diameter and which cross section the feedthrough has is substantially unimportant, as long as sufficient stability of the motor shaft remains and a sufficient pressure equalization is ensured between the front-end opening and the long-side opening. It is also substantially unimportant at which position in the longitudinal direction the long-side opening is formed in the motor shaft. It is important that the opening is not arranged on the region onto which a bearing is pressed. However, this requirement is simple to me. The long-side opening may be formed in the region of the middle of the motor shaft, i.e., in the region between 40% and 60% of the length of the motor shaft.

A sensor unit can be arranged in the bearing tube to measure a pressure in the bearing tube. Such a sensor unit is known, for example, from DE 10 2018 211 833 A1, to the content of which reference is hereby expressly made. By means of such a sensor unit, the pressure prevailing inside the bearing tube may be measured particularly easily and communicated to an evaluation unit.

In another embodiment of the first region, it is formed at the end of a motor shaft. The rotor of the electric motor or the impeller of the fan coupled to the rotor is also connected to a motor shaft here, which leads through a bearing tube in the electric motor and is rotatably mounted by means of at least one bearing. However, this motor shaft comprises a feedthrough which connects openings at both front ends of the motor shaft to one another. This means that an opening at one front end of the motor shaft is connected via the feedthrough to an opening at the opposite front end of the motor shaft. If the one front end of the motor shaft faces toward the inflow side of the fan, a first region can be formed at the opposite front end of the motor shaft. The way in which and the diameter with which the feedthrough is formed is also unimportant in this embodiment. It is typically required that the motor shaft has sufficient stability and that the feedthrough permits a sufficient pressure equalization between the front-end openings. However, this requirement is simple to implement. It is also to be understood here that if the one front end faces in the direction of the outflow side of the fan, a second region can be formed on the opposite front end of the motor shaft.

In another embodiment of the first region, it can be formed at an air gap. A housing of the electric motor of the fan is often designed in such a way that air gaps are present between rotor and stator of the electric motor for cooling the electric motor. A pressure can prevail at these air gaps which corresponds to an inflow-side pressure or is in a defined relationship thereto. Such an air gap can therefore also be used to form a first region. It is also to be understood here that a second region can also be formed at the air gap if the pressure prevailing there corresponds in the trend to the pressure on the outflow side.

In one embodiment of the second region, it can be formed in an electronics housing. If the electronics housing is formed on the electric motor on the outflow side, it has been shown that the static pressure prevailing there corresponds to the outflow-side pressure. The second region can therefore be formed in the electronics housing. It is also apparent here that an electronics housing oriented on the inflow side is suitable for forming a first region in the electronics housing.

A density value, which indicates the density of the conveyed medium, is typically required for the ascertainment of a volume flow of the medium. In one embodiment, this value can be estimated or can be transferred by a higher-order control unit to the evaluation unit. In another embodiment, the fan has a temperature sensor and/or a humidity sensor, wherein the temperature sensor measures a temperature of the medium moved by the fan and the humidity sensor measures a humidity content of the medium moved by the fan. The measured values obtained by the temperature sensor and/or the humidity sensor can then be transferred to the evaluation unit for ascertaining the density of the medium. Since the density of a gaseous medium is essentially dependent on the humidity and the temperature of the medium, the density of the medium can be determined relatively accurately in this way. The evaluation unit can accordingly additionally be designed to determine a density of the medium based on the obtained measured values.

In one refinement, the fan has a memory in which one or more pressure characteristic curves are stored. The evaluation unit can have a communication connection to the memory, so that the evaluation unit can access a pressure characteristic curve stored in the memory upon the determination of a volume flow and/or a mass flow of a medium. The memory can additionally be used by the evaluation unit to store ascertained values of the volume flows and/or mass flows of the medium, obtained actual speeds, determined/obtained actual pressure differences, and/or further values arising during the operation of the fan. The memory is, in an embodiment, formed here by a nonvolatile memory which maintains stored values even after a voltage supply is absent. This memory can be formed in greatly varying ways. Reference is made by way of example here to the use of a flash memory, an EEPROM (Electronically Erasable Programmable Read-Only Memory), an NVRAM (Non-volatile Random Access Memory), or another semiconductor memory.

In one refinement, the fan comprises a communication unit, by means of which the values determined by the evaluation unit for the volume flow and/or the mass flow can be communicated to a management unit and/or a higher-order regulating unit. The communication unit can be designed in greatly varying ways and greatly varying communication standards and technologies can be used for a data transfer from and to this communication unit. Digital transfer technologies can be used just as well as analog technologies. The transfer can take place in a wired or wireless manner. Parallel or serial transfer interfaces may be used. The transfer can be in packets or in direct connections. Solely by way of example, but not restricted thereto, reference is made to the use of Bluetooth, Bluetooth LE (Low Energy), NFC (Near Field Communication), Ethernet, RS485, Modbus, Profibus, CAN-Bus, or USB (Universal Serial Bus).

If the communication unit is used for communication with a management unit, the management unit can be constructed and used in various ways. It is thus conceivable that the management unit stores information values about the moved medium and provides them, for example, in the context of an industry 4.0 environment. The management unit can alternatively or additionally also be designed to transmit target value specifications and/or density values of the moved medium to the fan. The management unit can then form a system together with the fan.

If the communication unit is used for communication with a higher-order regulating unit, this regulating unit can form a system with the fan and can regulate the fan, for example, to a predefined target conveyance amount (mass flow, volume flow).

The electric motor of the fan can be designed in various ways. Synchronous motors may be used, as may asynchronous motors or DC motors. The electric motor is, in an embodiment, designed as an electronically commutated motor (EC motor). The electric motor is, in an embodiment, designed as an external rotor motor.

The core part of the fan according to the disclosure is an electric motor according to the disclosure in which elements for determining the media flow moved by the fan can be arranged. Such an electric motor has a stator and a rotor rotatably mounted relative to the stator, wherein the rotor is coupled to the impeller of the fan. The pressure sensor system, the speed ascertainment system, and the evaluation unit can be integrated in the electric motor according to the disclosure. An electronics chamber suggests itself for this integration, which is formed inside an electronics housing of the electric motor. By way of this or another integration, the pressure sensor system, the speed ascertainment system, and the evaluation unit become an integral part of the electric motor, so that the units are each fixedly coupled to the electric motor.

A method according to the disclosure, which in particular uses a fan according to the disclosure and in which the fan comprises an electric motor and an impeller driven by the electric motor, comprises the steps of ascertaining an actual pressure difference, ascertaining an actual speed of the impeller, and (quantitatively) determining a volume flow and/or a mass flow based on the actual pressure difference, the actual speed, and a pressure characteristic curve of the fan. A processor, in particular a microprocessor, can be provided here, which carries out the calculations and controls the steps of the method.

A pressure characteristic curve used by the fan according to the disclosure, the electric motor according to the disclosure, and/or the method according to the disclosure can be formed in various ways. It is thus conceivable that the pressure characteristic curve for a structurally-identical fan is ascertained as a type-related characteristic curve and during the production of another fan of the same type, this type-related characteristic curve is stored in a memory of the other fan. Since fans of the same type are similar in large parts, in this way a pressure characteristic curve can be distributed very easily to a plurality of fans. If the precision of the pressure characteristic curve is important and exemplary variations of the fans are to be substantially eliminated, carrying out dedicated calibration measurements for each individual fan and storing them in a memory of the fan suggests itself. In both cases, multiple calibration measurements can also be carried out and the pressure characteristic curve can be calculated as the mean value of the various calibration measurements. It is also conceivable that the pressure characteristic curve is determined and stored in relation to the application and advantageously in relation to the type at the same time, since it can be dependent to a certain extent on the installation situation of the fan. In this case, a procedure is advantageously implemented for the user in the fan for how he can store a pressure characteristic curve.

There are various options for advantageously designing and refining the teaching of the present disclosure. For this purpose, reference is made on the one hand to the claims subordinate to the concurrent claims and on the other hand to the following explanation of exemplary embodiments of the disclosure with reference to the drawings. In conjunction with the explanation of the exemplary embodiments of the disclosure with reference to the drawing, general designs and refinements of the teaching are also explained.

DETAILED DESCRIPTION OF THE DISCLOSURE

Figure 1:
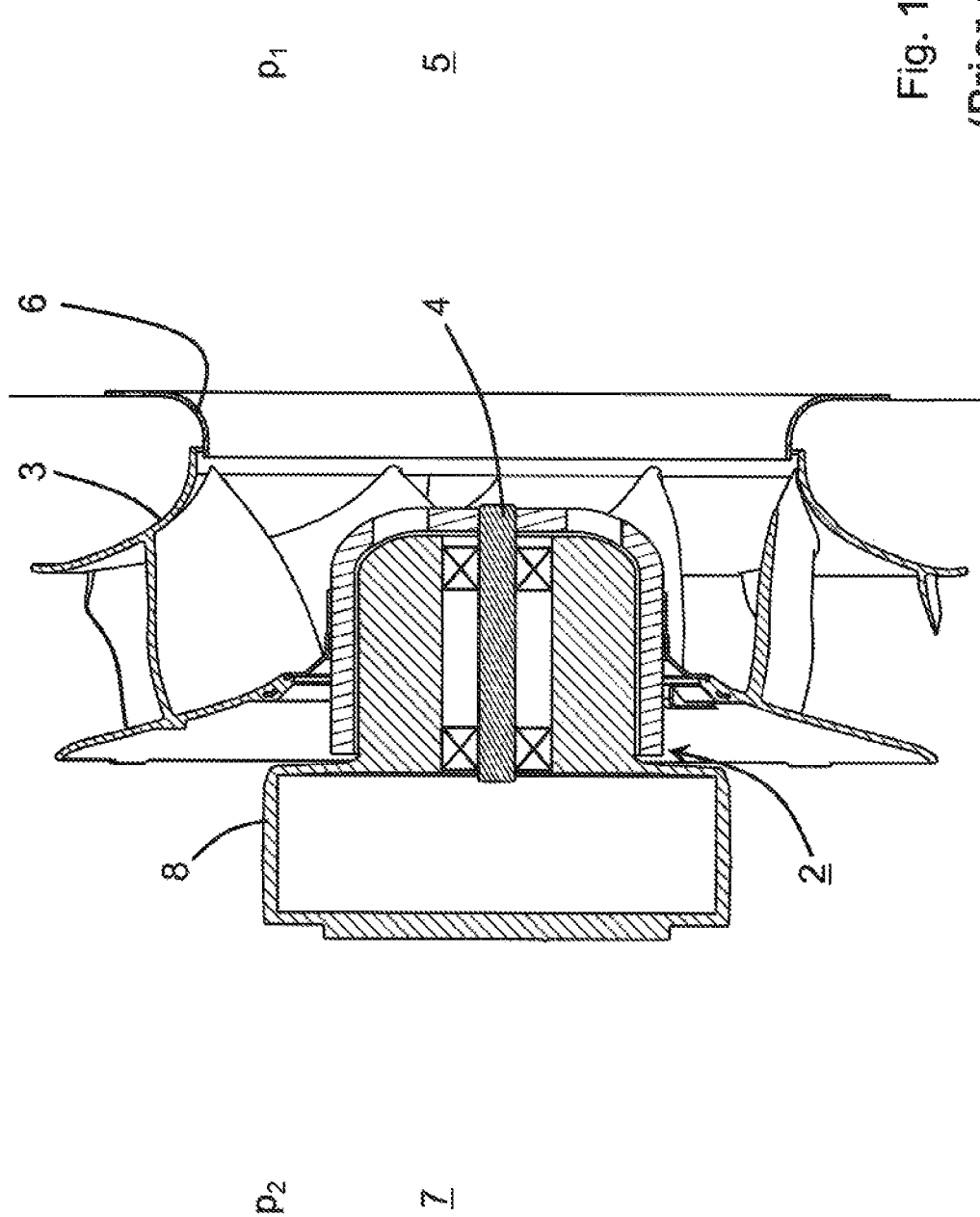
FIG. 1 shows a section through an exemplary fan according to the prior art.

FIG. 1 shows a section through an exemplary fan, which is known from the prior art and from which each of the exemplary embodiments described hereinafter originate. In the description of this known fan, elements which also occur or can occur in an exemplary embodiment of the fan according to the disclosure are provided with the same reference signs as in the exemplary embodiments.

Figure 3:
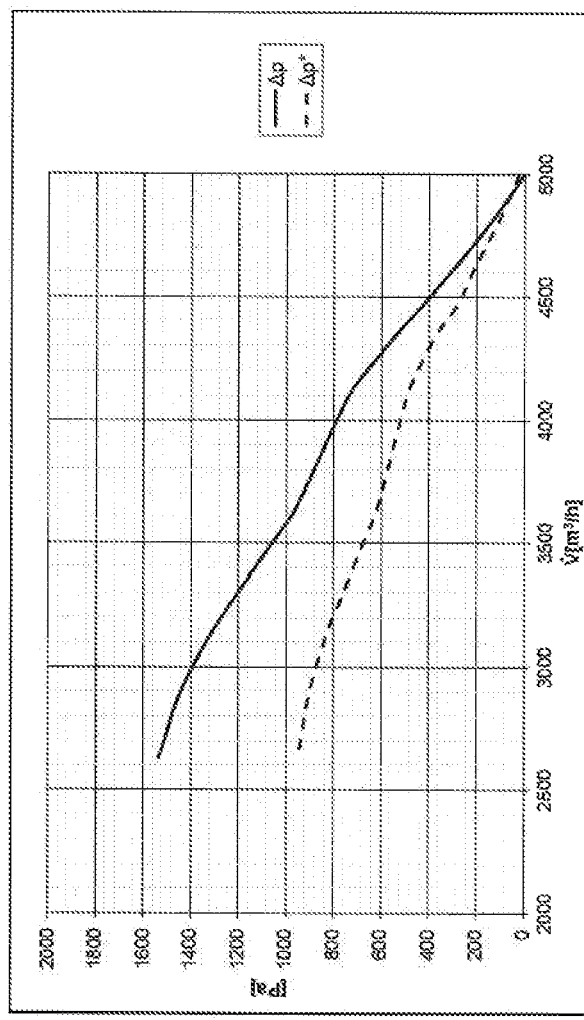
FIG. 3 shows a diagram having a dependency of various differential pressures on a volume flow conveyed by the fan.

The fan shown in FIG. 1 comprises an electric motor 2 and an impeller 3, which is rotatably mounted around a motor shaft 4 relative to the electric motor 2 and is driven by the electric motor 2. The impeller 3 and thus the fan moves a media flow—in the present case an air flow—from an inflow side 5 through an inlet nozzle 6 and the impeller 3 to an outflow side 7. On the outflow side, an electronics housing 8 is arranged on the electric motor 2, in which electronics of the electric motor can be arranged. These electronics can generate, for example, a system of feed signals, wherein the system of feed signals can generate a rotating field in the electric motor which induces a rotational movement of the rotor. During operation of the fan, a pressure $p_1$ results on the inflow side and a pressure $p_2$ results on the outflow side. A pressure difference $\Delta p = p_2 - p_1$ can be calculated therefrom. This pressure difference and a media flow moved by the impeller have a defined dependence which is shown by way of example in the diagram according to FIG. 3 as a solid line. This fan forms the starting point for the exemplary embodiments of a fan according to the disclosure described hereinafter.

Figure 2:
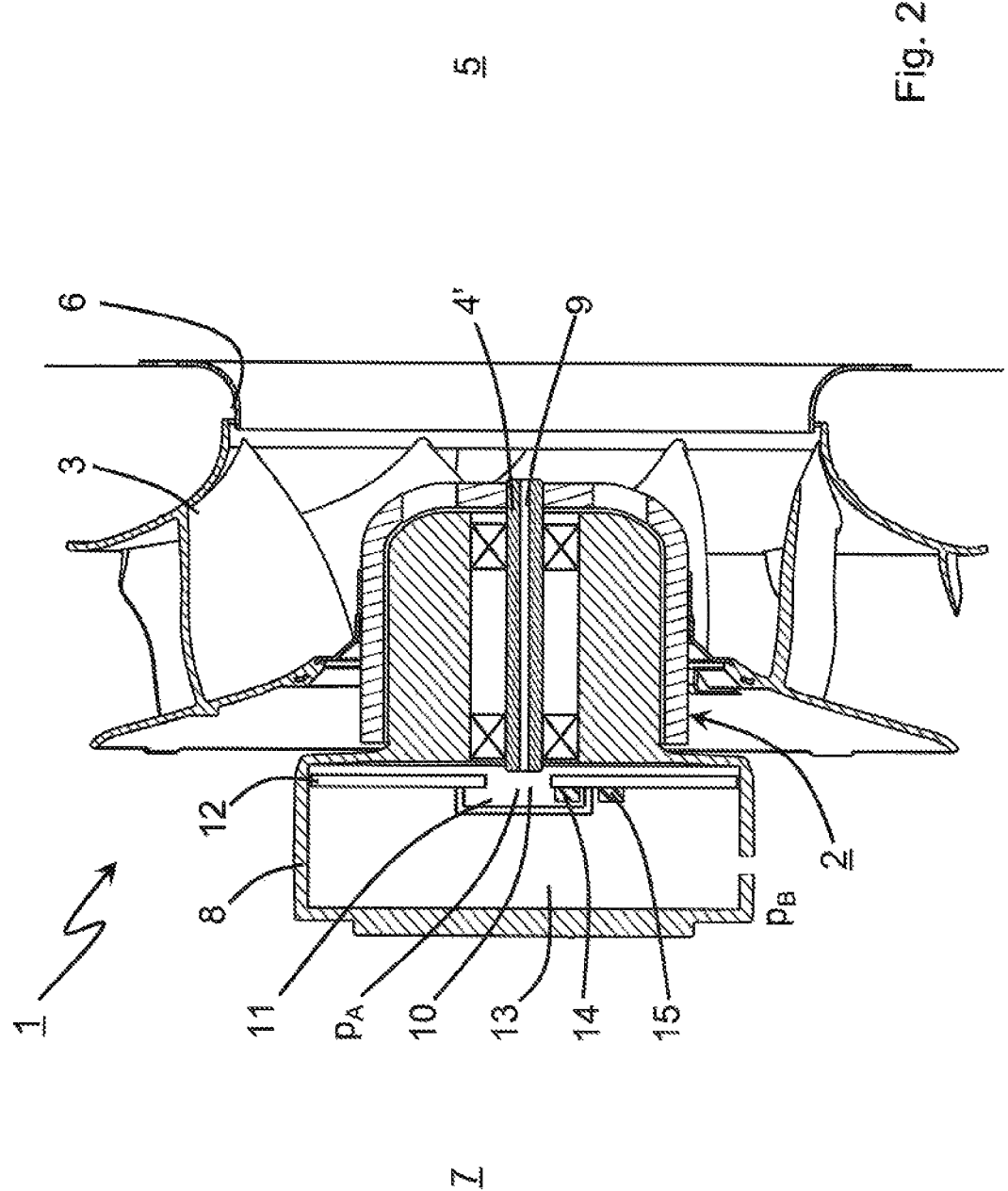
FIG. 2 shows a first exemplary embodiment of a fan according to the disclosure having a hollow shaft and a first and second region separated by a bulkhead.

A first exemplary embodiment of a fan according to the disclosure is shown in FIG. 2. The fan 1 is constructed similarly to the fan shown in FIG. 1. The motor shaft 4' of the present fan 1 comprises a feedthrough 9, which connects an opening on a front end of the motor shaft 4' to an opening on the opposite front end of the motor shaft 4'. The feedthrough 9 is formed as a central bore, so that the motor shaft 4' is a hollow shaft. In this way, a pressure $p_A$ results at the front end of the motor shaft 4' facing away from the inflow side 5, which corresponds to the pressure $p_1$ on the inflow side 5. The region having pressure $p_A$ can form a first region 10 in the meaning of the present disclosure.

In order that a pressure equalization does not occur, a bulkhead 11 is arranged in the electronics housing 8, which is fastened on a printed circuit board 12 of the motor electronics or directly on the base of the electronics housing. In this way, on the one hand, dirt and moisture is prevented from entering the electronics housing from the inflow side. On the other hand, a subdivision results due to this bulkhead 11, which separates the first region 10 from a second region 13. The bulkhead 11 and the printed circuit board 12 together prevent a pressure equalization between the regions 10 and 13 having the pressures $p_A$ or $p_B$, respectively.

In the second region 13, a (static) pressure $p_B$ results which corresponds to the outflow-side pressure $p_2$. These pressures $p_A$ and $p_B$ are measured by a first and a second absolute pressure sensor 14, 15, wherein the two absolute pressure sensors are each arranged on the printed circuit board 12 of the motor electronics in FIG. 2. An actual pressure difference $\Delta p^*$ results according to $\Delta p^* = p_B - p_A$. This actual pressure difference $\Delta p^*$ also has, like the pressure difference $\Delta p$, a dependence on the volume flow moved by the fan. This relationship is shown as a dashed line in FIG. 3. It can be seen that both illustrated pressure characteristic curves (solid and dashed lines) are approximately proportional to one another. Moreover, both pressure characteristic curves, at least in the relevant illustrated region, are a strictly monotonously decreasing function of the volume flow. Therefore, the pressure characteristic curve $\Delta p^*$ (at least in this characteristic curve region) may be used to determine a volume flow and/or a mass flow of a medium moved by the fan. This shows that using the fan according to the disclosure, a pressure difference measurement can be measured locally in the region of the motor to form a system for determining the volume flow or the mass flow in operation compactly and locally in the region of the motor, without electrical lines or hoses having to be led away from the motor. If the pressure difference $\Delta p^*$ is used, only a calibration characteristic curve with respect to the corresponding local pressure difference $\Delta p^*$ has to be stored on the fan. Density and speed dependencies are to be treated here as already described at another point.

Figure 4:
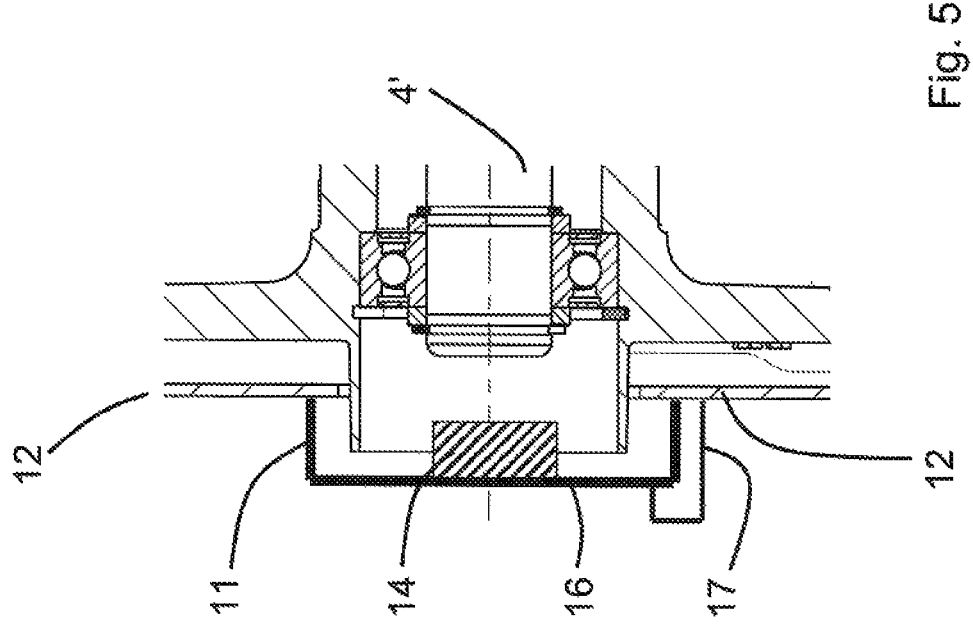
FIG. 4 shows an enlargement in the region of a bulkhead having an exemplary arrangement of an absolute pressure sensor, wherein the enlargement shows an embodiment similar to FIG. 2.
Figure 5:
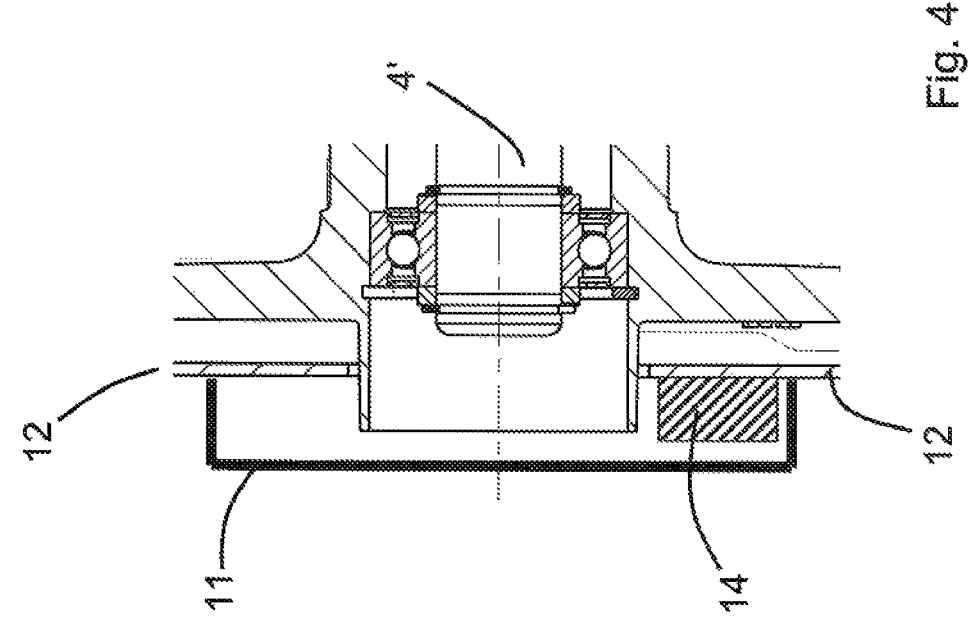
FIG. 5 shows an enlargement in the region of a bulkhead, having another exemplary arrangement of an absolute pressure sensor, wherein the enlargement shows an embodiment similar to FIG. 2.

FIGS. 4 and 5 show two possible arrangements of a first absolute pressure sensor 14 in an enlargement, wherein the enlargement shows an embodiment similar to FIG. 2. In FIG. 4, the first absolute pressure sensor 14 is arranged—as in FIG. 2—on the printed circuit board 12 of the motor electronics. The bulkhead 11 is formed by a hollow-cylindrical component, for example made of plastic. In FIG. 5, the first absolute pressure sensor is arranged directly opposite to the electronics-side front end of the motor shaft 4'. The cover surface of the bulkhead 11 can be formed for this purpose by a printed circuit board 16, which can be connected by means of a cable 17 (for example a ribbon cable) to the printed circuit board 12 and thus to the motor electronics.

Figure 6:
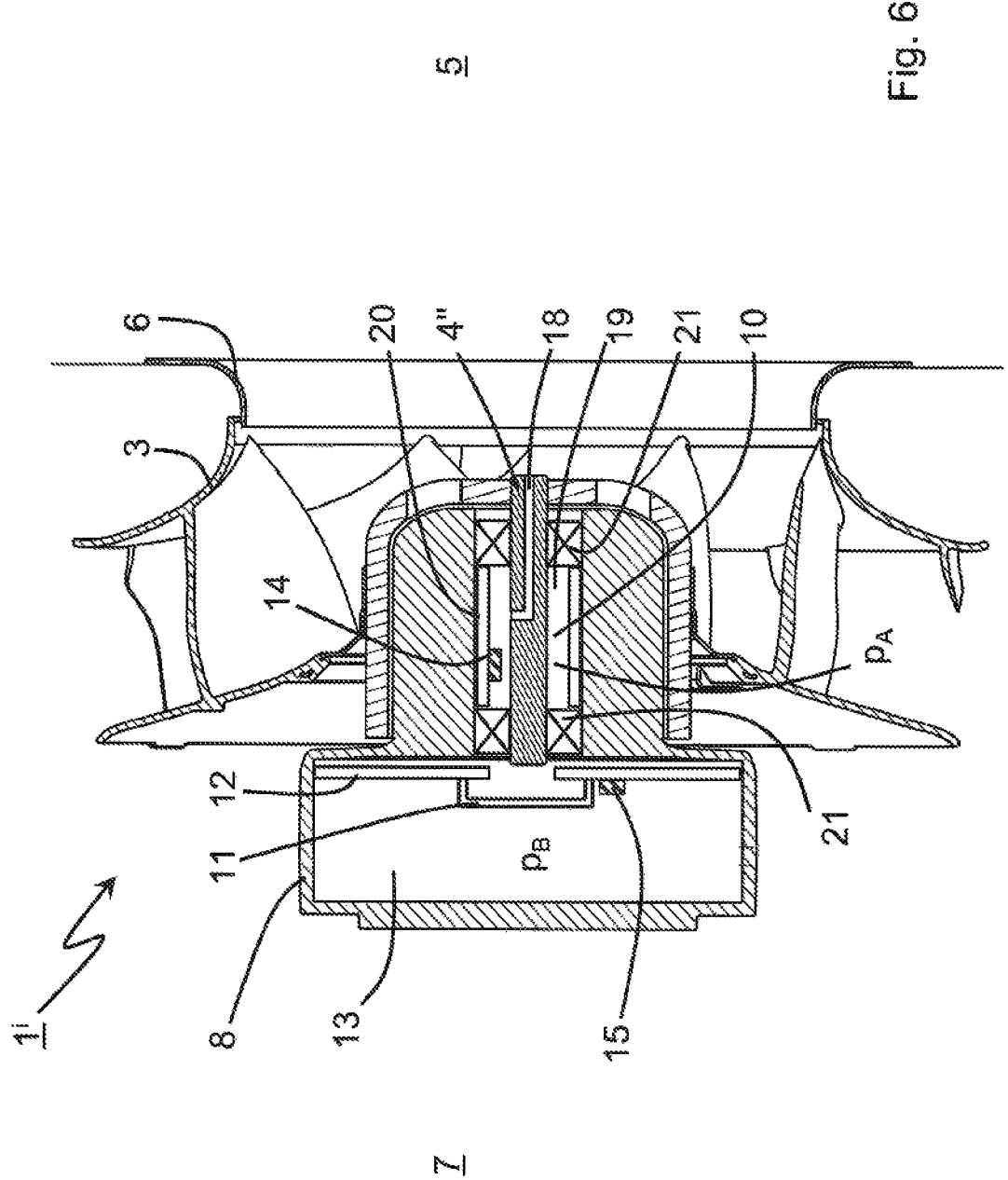
FIG. 6 shows a section through a second exemplary embodiment of a fan according to the disclosure having a partially hollow shaft, a first region in a bearing tube, and a second region in an electronics housing.

FIG. 6 shows a second exemplary embodiment of a fan 1' according to the disclosure. In this exemplary embodiment, the motor shaft 4" is only formed in parts as a hollow shaft. A feedthrough 18 connects an opening at a front end of the motor shaft 4" to an opening on a long side of the motor shaft 4". The feedthrough 18 is formed by a central bore extending approximately up to the long-side middle of the motor shaft 4" and by a transverse bore. The front end of the motor shaft 4" having the opening to the feedthrough 18 is oriented on the inflow side 5. A pressure equalization can thus result between the inflow side 5 and a bearing tube 19. In this way, the first region 10 in the meaning of the present disclosure is formed in the bearing tube 19 and a pressure $p_A$ results there. This pressure $p_A$ can be measured, for example, by a sensor arrangement 20, which is inserted into the bearing tube 19 and is described in detail in DE 10 2018 211 833 A1. This sensor arrangement 20 can comprise a first absolute pressure sensor 14, which measures the pressure $p_A$. Since the bearings 21 at the two ends of the bearing tube 19 do not prevent a pressure equalization of the bearing tube 19 and are permeable, a bulkhead 11 is also arranged in this exemplary embodiment, which separates the first region 10 and a second region 13 formed in the electronics housing 8. It is also conceivable in other embodiments that no bulkhead is formed and bearings are used which prevent a pressure equalization. A second absolute pressure sensor 15 can measure the pressure $p_B$ prevailing in the second region 13.

Figure 7:
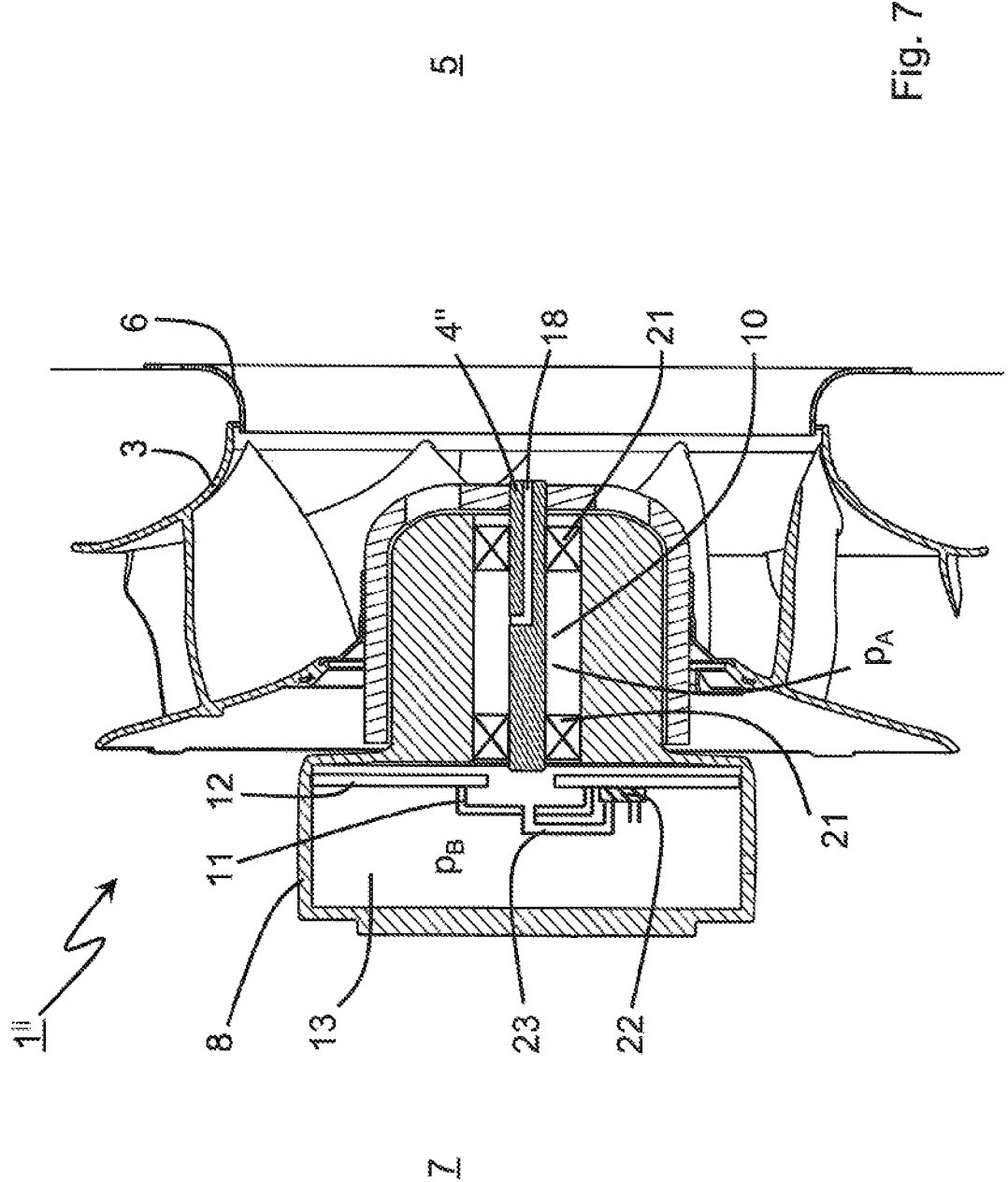
FIG. 7 shows a modification of the exemplary embodiment according to FIG. 6, in which the actual pressure difference is measured by means of a differential pressure sensor.

A very similar embodiment of a fan according to the disclosure is shown in FIG. 7. In contrast to FIG. 6, in the fan $1^{ii}$, no sensor arrangement 20 is present in the bearing tube 19. Instead, a differential pressure sensor 22 is used. A first fitting, which offers access to a first sensor surface (not shown), is connected via a hose 23 and through the bulkhead 11 to the first region 10, so that the pressure $p_A$ of the first region 10 is applied to this first sensor surface, in particular if a pressure equalization is possible through the electronics-side bearing 21. A second fitting, which offers access to a second sensor surface (not shown), is open toward the interior of the electronics housing 8, so that the pressure $p_B$ inside the electronics housing 8 and thus inside the second region 13 is applied to this second sensor surface. In this way, the differential pressure sensor 22 can measure the actual differential pressure difference $\Delta p^*$.

Figure 8:
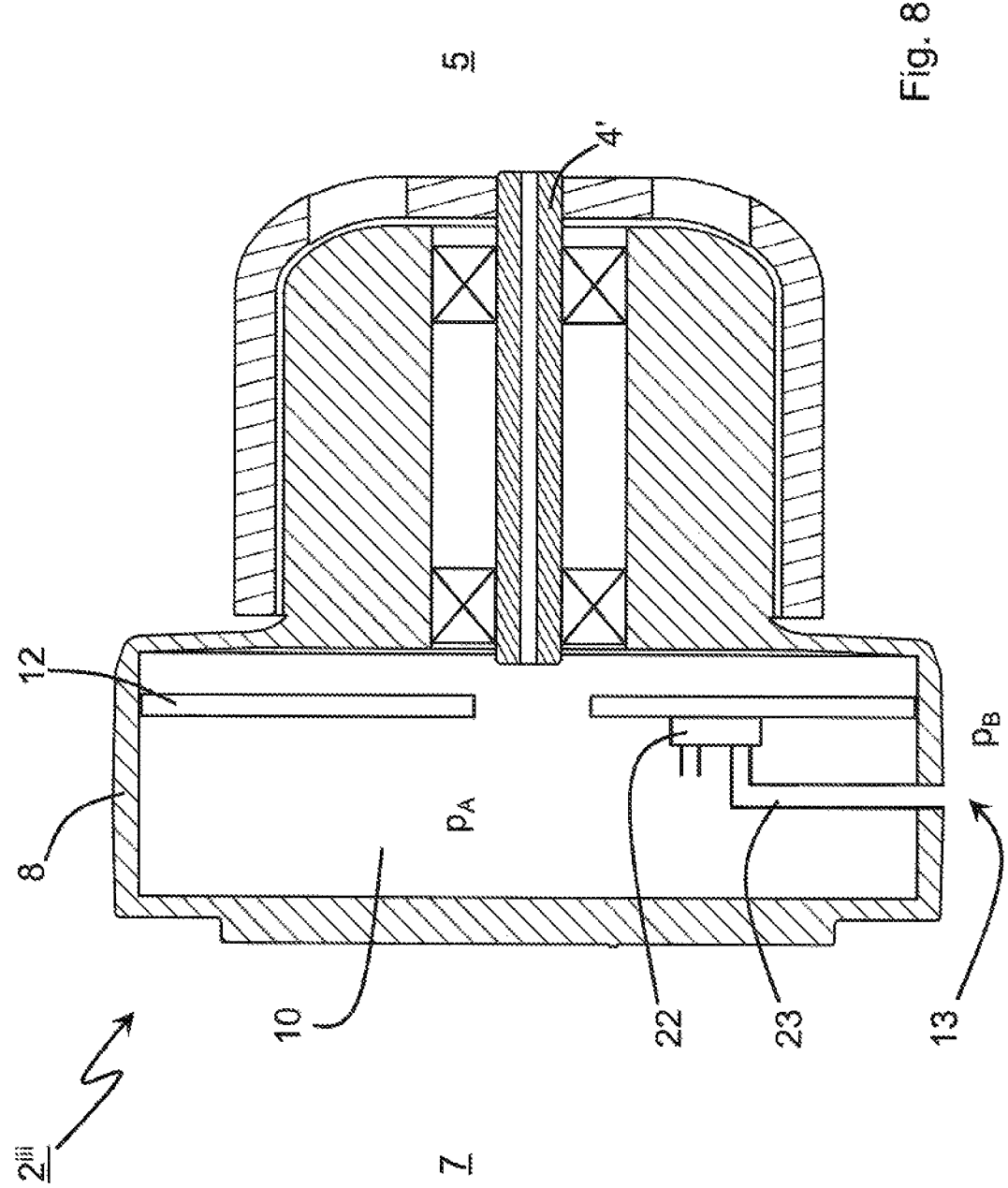
FIG. 8 shows a section through an electric motor of a third exemplary embodiment of a fan according to the disclosure having a differential sensor and a first region formed in an electronics housing and a second region formed outside the electronics housing.

FIG. 8 shows the electric motor $2^{iii}$ of a third exemplary embodiment of a fan according to the disclosure. Similarly as in the first exemplary embodiment according to FIG. 2, the motor shaft 4' of this electric motor $2^{iii}$ is formed as a hollow shaft. However, no bulkhead is present in this exemplary embodiment, so that a pressure $p_A$ results in the electronics housing 8, which corresponds to the pressure on the inflow side 5. Therefore, in this exemplary embodiment a first region 10 in the meaning of the present disclosure is formed in the electronics housing 8. The second region 13 is formed in this exemplary embodiment outside the electric motor $2^{iii}$, namely near the outer surface of the electronics housing 8. A differential pressure sensor 22, which is arranged on a printed circuit board 12 of the motor electronics, measures the actual pressure difference $\Delta p^*$. A first fitting of the differential pressure sensor 22 is left open here toward the interior of the electronics housing 8, so that the pressure $p_A$ of the first region 10 is applied to a first sensor surface. The second fitting of the differential pressure sensor 22 is connected using a hose or duct 23 through a wall of the electronics housing 8 to the second region 13. In this way, the differential pressure sensor 22 also measures a differential pressure in this exemplary embodiment $\Delta p^*$, which is suitable for determining a volume flow and/or a mass flow of a medium moved by the fan.

Figure 9:
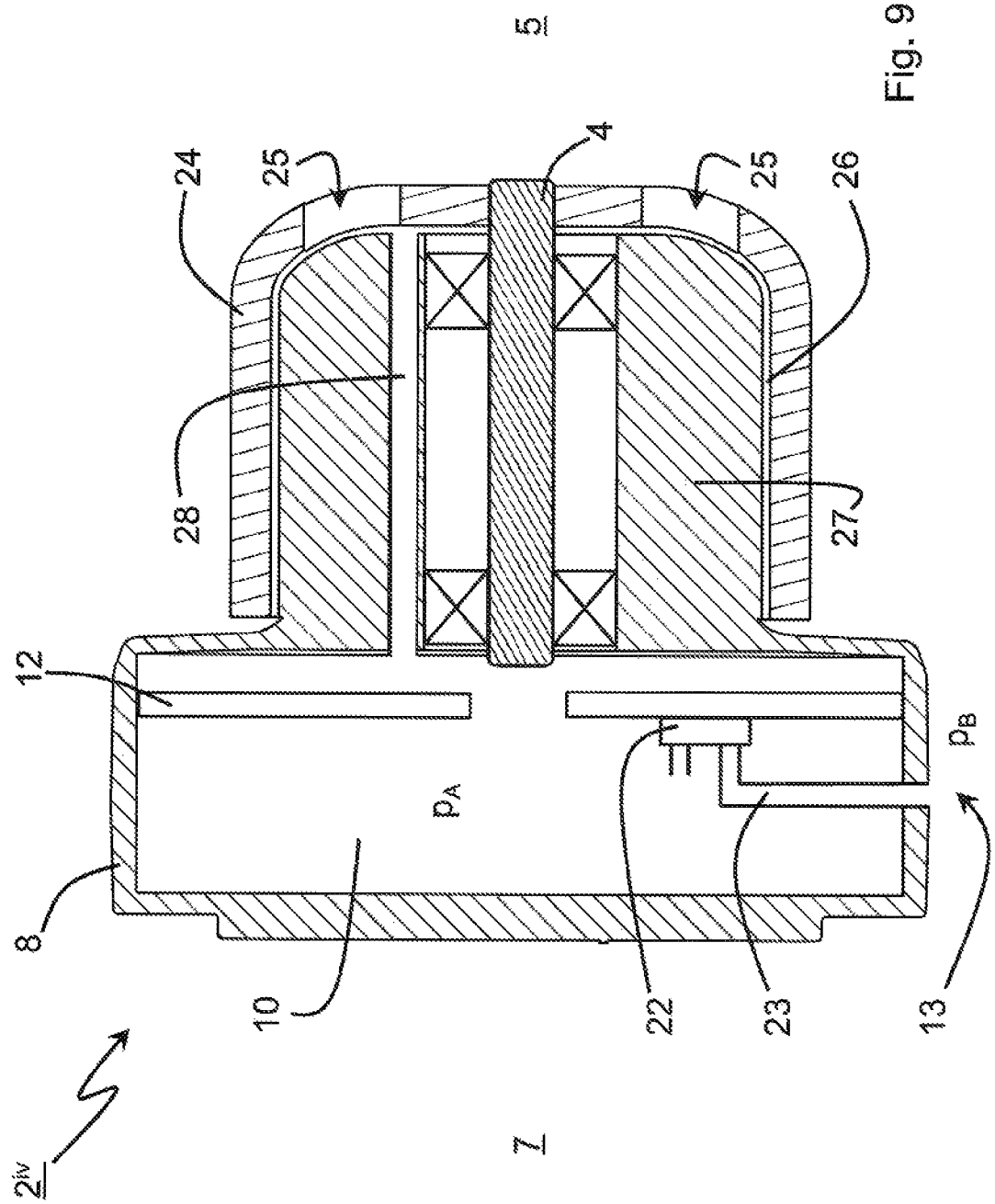
FIG. 9 shows a section through an electric motor of a fourth exemplary embodiment of a fan according to the disclosure having a differential pressure sensor and a feedthrough formed by a pressure duct to a first region.

FIG. 9 shows an electric motor $2^{iv}$ of a fourth exemplary embodiment of a fan according to the disclosure. A differential pressure sensor 22 detects an actual pressure difference $\Delta p^*$, wherein a first sensor surface of the differential pressure sensor 22 detects a pressure $p_A$ and a second sensor surface detects a pressure $p_B$. The first region 10 is formed in the interior of the electronics housing 8. A connection to the inflow side 5 results via a pressure duct 28, for example in the form of a groove. In one possible embodiment, the pressure duct 28 leads from the interior of the electronics housing 8 through the stator 27 into a region near an air passage 25. The pressure $p_A$ or a value that can be correlated thereto is made accessible to the first sensor surface of the sensor 22 through the air passage 25, for example, embodied as a condensed water hole or cooling opening. It is of secondary importance here whether the pressure duct 28 is applied directly in the immediate vicinity of the air passage 25, or an arbitrary region of an air gap 26 is attached. It is solely important that the tapped pressure $p_A$ correlates with the pressure $p_1$ of the inflow side 5. For the sake of completeness, it is to be noted that in embodiments in which the rotor housing 24 of the motor 2 faces toward an outflow side 7 instead of the inflow side 5, the regions for pressures $p_1$ and $p_2$ or $p_A$ and $p_B$ occur exchanged with one another with respect to the motor 2.

Figure 10:
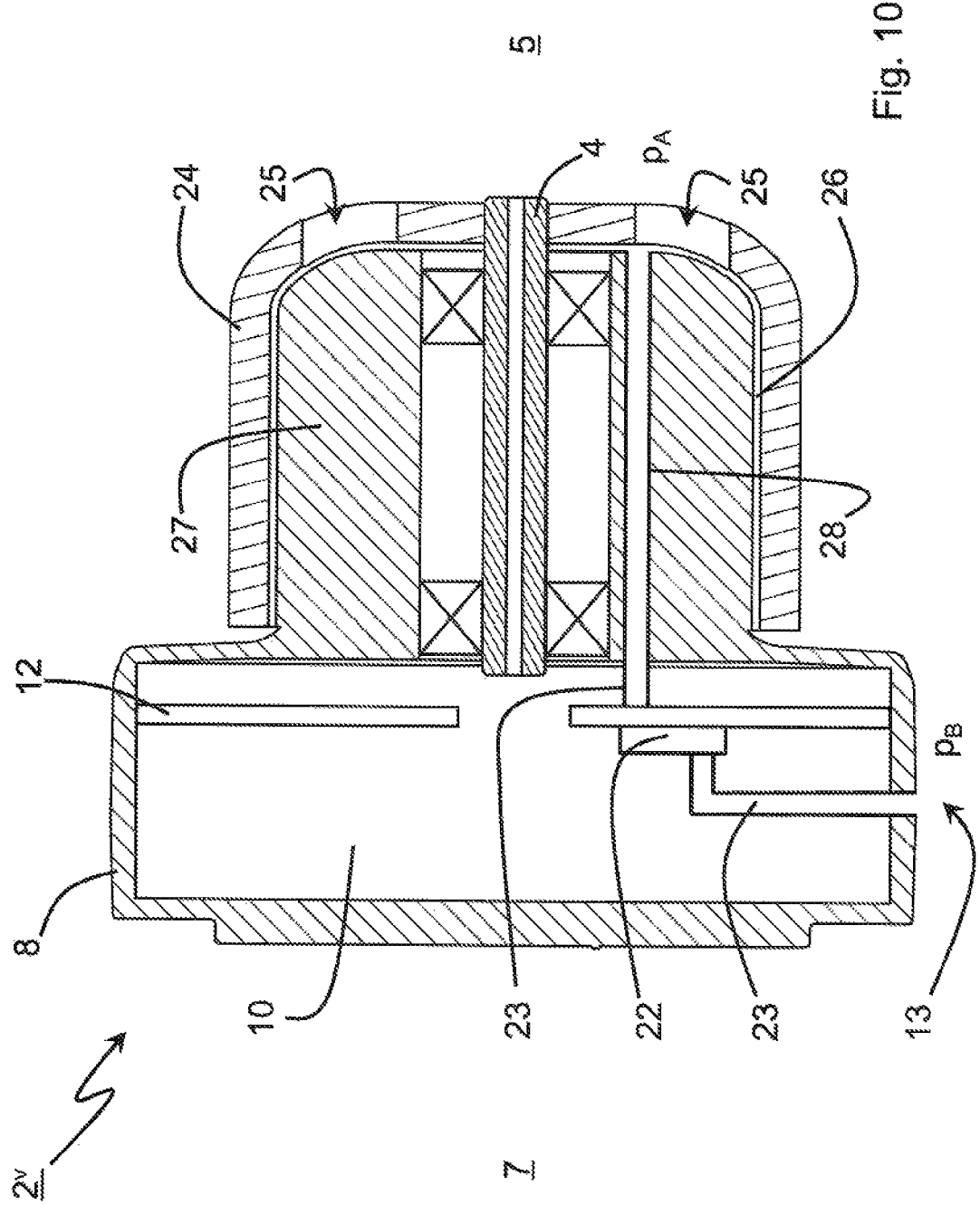
FIG. 10 shows a variant of the fourth exemplary embodiment of a fan according to the disclosure according to FIG. 9.

FIG. 10 shows a variant of an electric motor $2^v$ of the exemplary embodiment according to FIG. 9. A pressure duct 28 through the rotor 27 of the electric motor $2^v$ is also used here. However, the first sensor surface of the differential pressure sensor 22 is connected directly via a hose 23 to the pressure duct 28.

Reference is made to the general part of the description and to the appended claims with respect to further advantageous embodiments of the fan according to the disclosure, the electric motor according to the disclosure, and the method according to the disclosure to avoid repetitions.

Finally, it is to be expressly noted that the above-described exemplary embodiments are used solely to explain the claimed teaching, but do not restrict it to the exemplary embodiments.

LIST OF REFERENCE NUMERALS 1 fan
2 electric motor
3 impeller
4 motor shaft
5 inflow side
6 inlet nozzle
7 outflow side
8 electronics housing
9 feedthrough
10 first region
11 bulkhead
12 printed circuit board of the motor electronics
13 second region
14 first absolute pressure sensor
15 second absolute pressure sensor 16 printed circuit board for sensor
17 cable
18 feedthrough
19 bearing tube
20 sensor arrangement
21 bearing
22 differential pressure sensor
23 hose
24 rotor housing
25 air passage
26 air gap
27 stator, winding
28 pressure duct

The invention claimed is:

1. A fan for determining a media flow moved by the fan (1), the fan having an electric motor (2) and an impeller (3) driven by the electric motor (2), wherein the impeller (3) moves a gaseous medium in a media flow from an inflow side (5) to an outflow side (7), comprising:
a pressure sensor system,
a speed ascertainment system,
an evaluation unit, and
a bulkhead (11), which is formed inside the electric motor (3);
wherein the pressure sensor system is designed to ascertain an actual pressure difference ($\Delta p^*$) between a first region (10) and a second region (13) wherein the bulkhead (11) prevents or reduces a pressure equalization between the first region (10) and the second region (13), wherein at least one of the first region (10) and the second region (13) is formed in the electric motor (2), wherein a pressure ($p_A$) prevails in the first region (10) which corresponds to a pressure ($p_1$) present on the inflow side, wherein a pressure ($p_B$) prevails in the second region (13) which corresponds to a pressure ($p_2$) present on the outflow side,
wherein the speed ascertainment system is designed to ascertain an actual speed (n) of the impeller (3), and
wherein the evaluation unit is designed to determine at least one of a mass flow and a volume flow of the medium based on the actual pressure difference ($\Delta p^*$), the actual speed (n), and a pressure characteristic curve of the fan (1).

2. The fan as claimed in claim 1, wherein the pressure sensor system comprises a first and a second absolute pressure sensor (14, 15), wherein the first absolute pressure sensor (14) measures the pressure ($p_A$) in the first region (10) and the second absolute pressure sensor (15) measures the pressure ($p_B$) in the second region (13).

3. The fan as claimed in claim 2, wherein the first absolute pressure sensor (14) is arranged in the first region (10) or in a first measurement chamber connected via a hose or duct (23) to the first region (10).

4. The fan as claimed in claim 2, wherein the second absolute pressure sensor (15) is arranged in the second region (13) or in a second measurement chamber connected via a hose or duct (23) to the second region (13).

5. The fan as claimed in claim 1, wherein the pressure sensor system comprises a differential pressure sensor (22), wherein a first sensor surface of the differential pressure sensor (22) is subjected to the pressure ($p_A$) in the first region (10) and a second sensor surface of the differential pressure sensor (22) is subjected to the pressure ($p_B$) in the second region (13).

6. The fan as claimed in claim 1, wherein the impeller is connected to a motor shaft, wherein the motor shaft is led through a bearing tube in the electric motor and is rotatably mounted by means of at least one bearing, wherein the motor shaft comprises a feedthrough which connects an opening on a front end of the motor shaft to an opening on a side of the motor shaft, and wherein the first region or the second region is formed in the bearing tube.

7. The fan as claimed in claim 1, wherein the impeller is connected to a motor shaft, wherein the motor shaft is led through a bearing tube in the electric motor and is rotatably mounted by means of at least one bearing, wherein the motor shaft comprises a feedthrough which connects openings at the two ends of the motor shaft to one another, and wherein the first region or the second region is formed on one of the two ends of the motor shaft.

8. The fan as claimed in claim 1, wherein the first region is formed at an air gap, wherein the air gap is formed between a rotor and a stator of the electric motor and establishes a connection between surroundings of the electric motor and the first region or the second region.

9. The fan as claimed in claim 1, further comprising an electronics housing (8) formed on the outflow side on the electric motor (2), wherein the second region (13) or the first region (10) is formed in the electronics housing (8).

10. The fan as claimed in claim 1, further comprising a temperature sensor and a humidity sensor, wherein the temperature sensor measures a temperature of the medium moved by the fan (1) and the humidity sensor measures a humidity of the medium moved by the fan (1) and wherein measured values obtained by the temperature sensor and the humidity sensor are transferred to the evaluation unit to ascertain a density of the medium.

11. The fan as claimed in claim 1, further comprising a memory, wherein the pressure characteristic curve is stored in the memory.

12. The fan as claimed in claim 1, further comprising a communication unit by means of which values for at least one of the mass flow and the volume flow determined by the evaluation unit can be communicated to at least one of a management unit and a higher-order regulating unit.

13. The fan as claimed in claim 1, wherein the electric motor is designed as an electronically commutated motor.

14. The fan as claimed in claim 1, wherein the electric motor has a stator and a rotor rotatably mounted relative to the stator and wherein the rotor is coupled to the impeller of the fan.

15. A method for determining a media flow moved by a fan, wherein the fan (1) comprises an electric motor (2) and an impeller (3) driven by the electric motor (2), wherein the method comprises the following steps:
ascertaining an actual pressure difference ($\Delta p^*$) between a first region (10) and a second region (13), wherein the first region (10) and the second region (13) are formed in the electric motor (2) and a bulkhead (11) prevents or reduces a pressure equalization between the first region (10) and the second region (13), wherein a pressure ($p_A$) prevails in the first region (10), which pressure corresponds to a pressure ($p_1$) present on an inflow side, wherein a pressure ($p_B$) prevails in the second region (13), which pressure corresponds to a pressure ($p_2$) present on an outflow side,
ascertaining an actual speed (n) of the impeller (3), and
determining a volume flow and/or a mass flow of the media flow based on the actual pressure difference ($\Delta p^*$), the actual speed (n), and a pressure characteristic curve of the fan (1).

16. The method as claimed in claim 15, wherein the pressure characteristic curve is ascertained during a calibration measurement of the fan (1) or a fan of the same type.

* * * * *